(12) United States Patent
Hurwitz

(10) Patent No.: US 8,408,730 B2
(45) Date of Patent: Apr. 2, 2013

(54) INTERCHANGEABLE ATTACHMENTS FOR ACCESSORIES FOR PETS

(75) Inventor: Marni Markell Hurwitz, Far Hills, NJ (US)

(73) Assignee: I Did It, Inc., Far Hills, NJ (US)

( * ) Notice: Subject to any disclaimer, the term of this patent is extended or adjusted under 35 U.S.C. 154(b) by 556 days.

(21) Appl. No.: 12/658,267

(22) Filed: Feb. 9, 2010

(65) Prior Publication Data

US 2010/0277945 A1 Nov. 4, 2010

Related U.S. Application Data

(63) Continuation-in-part of application No. 12/590,156, filed on Nov. 3, 2009, which is a continuation-in-part of application No. 12/460,705, filed on Jul. 23, 2009, now Pat. No. 8,142, 053.

(60) Provisional application No. 61/215,370, filed on May 4, 2009.

(51) Int. Cl.
*F21V 21/08* (2006.01)

(52) U.S. Cl. ...................... 362/108; 362/84; 362/249.16

(58) Field of Classification Search .................... 362/84, 362/103, 108, 249.16
See application file for complete search history.

(56) References Cited

U.S. PATENT DOCUMENTS

| 3,871,336 A | 3/1975 | Bergman | 119/106 |
|---|---|---|---|
| 3,999,521 A | 12/1976 | Puiello | 359/518 |
| 4,167,156 A | 9/1979 | Kupperman | 119/795 |
| 4,173,201 A | 11/1979 | Chao | 119/859 |
| 4,263,951 A | 4/1981 | Siegel | 150/111 |
| 4,513,692 A | 4/1985 | Kuhnsman | 119/797 |
| 4,887,552 A | 12/1989 | Hayden | 119/793 |
| 4,895,110 A | 1/1990 | LoCascio | 119/859 |
| 4,999,747 A * | 3/1991 | Chen | 362/103 |
| 5,046,456 A | 9/1991 | Heyman | 119/859 |
| 5,140,946 A | 8/1992 | Pennock | 119/859 |
| 5,363,809 A | 11/1994 | Roe | 119/792 |
| 5,370,082 A | 12/1994 | Wade | 119/859 |
| 5,429,075 A | 7/1995 | Passarella | 119/795 |
| 5,523,927 A | 6/1996 | Gokey | 362/103 |
| 5,535,106 A | 7/1996 | Tangen | 362/108 |
| 5,558,044 A | 9/1996 | Nasser, Jr. | 119/796 |
| 5,630,382 A | 5/1997 | Barbera | 199/859 |
| 5,762,029 A | 6/1998 | DuBois | 119/796 |
| 5,774,892 A | 7/1998 | Tisdale | 2/69 |
| 5,803,266 A | 9/1998 | Blackwelder | 206/575 |
| 5,850,807 A | 12/1998 | Keeler | 119/799 |
| 5,967,095 A | 10/1999 | Greves | 119/795 |

(Continued)

*Primary Examiner* — David V Bruce
(74) *Attorney, Agent, or Firm* — Ernest D. Buff; Ernest D. Buff & Assoc. LLC; Margaret A. LaCroix

(57) ABSTRACT

An article forming pet gear (such as a pet coat, jacket, shirt or sweater) having a plurality of interchangeable attachments appointed to modify the article's look, feel and function. The article comprises a proximal end, distal end and a central section appointed to receive the interchangeable attachment. The interchangeable attachment includes a top wall having a show surface and a back wall having a securing member adapted to engage with the article for removably attaching the interchangeable attachment to the article. The interchangeable attachments have a plethora of designs and may include LED, fiber optic and/or reflective properties to provide aesthetic appeal, the ability to design one's own accessory, enhanced visibility, and/or increased safety of the pet during nighttime or dusk hours. They may also be treated with insect repellent, fragrance enhancers, and/or water repellant agents.

25 Claims, 10 Drawing Sheets

U.S. PATENT DOCUMENTS

| | | | |
|---|---|---|---|
| 6,170,968 B1 | 1/2001 | Caswell | 362/469 |
| 6,189,542 B1 | 2/2001 | Shepard | 132/237 |
| 6,209,351 B1 | 4/2001 | Zeleny | 63/1.16 |
| 6,289,849 B1 | 9/2001 | Macedo | 119/796 |
| 6,557,498 B1 | 5/2003 | Smierciak | 119/858 |
| 6,688,316 B1 | 2/2004 | Klug | 132/286 |
| 6,971,424 B1 | 12/2005 | Angevine | 150/104 |
| 7,350,342 B2 | 4/2008 | Owens | 54/12 |
| 7,421,980 B1 * | 9/2008 | Ehlers | 119/858 |
| 8,142,053 B2 * | 3/2012 | Hurwitz | 362/249.16 |
| 2009/0044430 A1 | 2/2009 | Philpott | 36/136 |
| 2009/0100714 A1 | 4/2009 | Coger | 36/100 |
| 2009/0130954 A1 | 5/2009 | Maricevic | 450/88 |

* cited by examiner

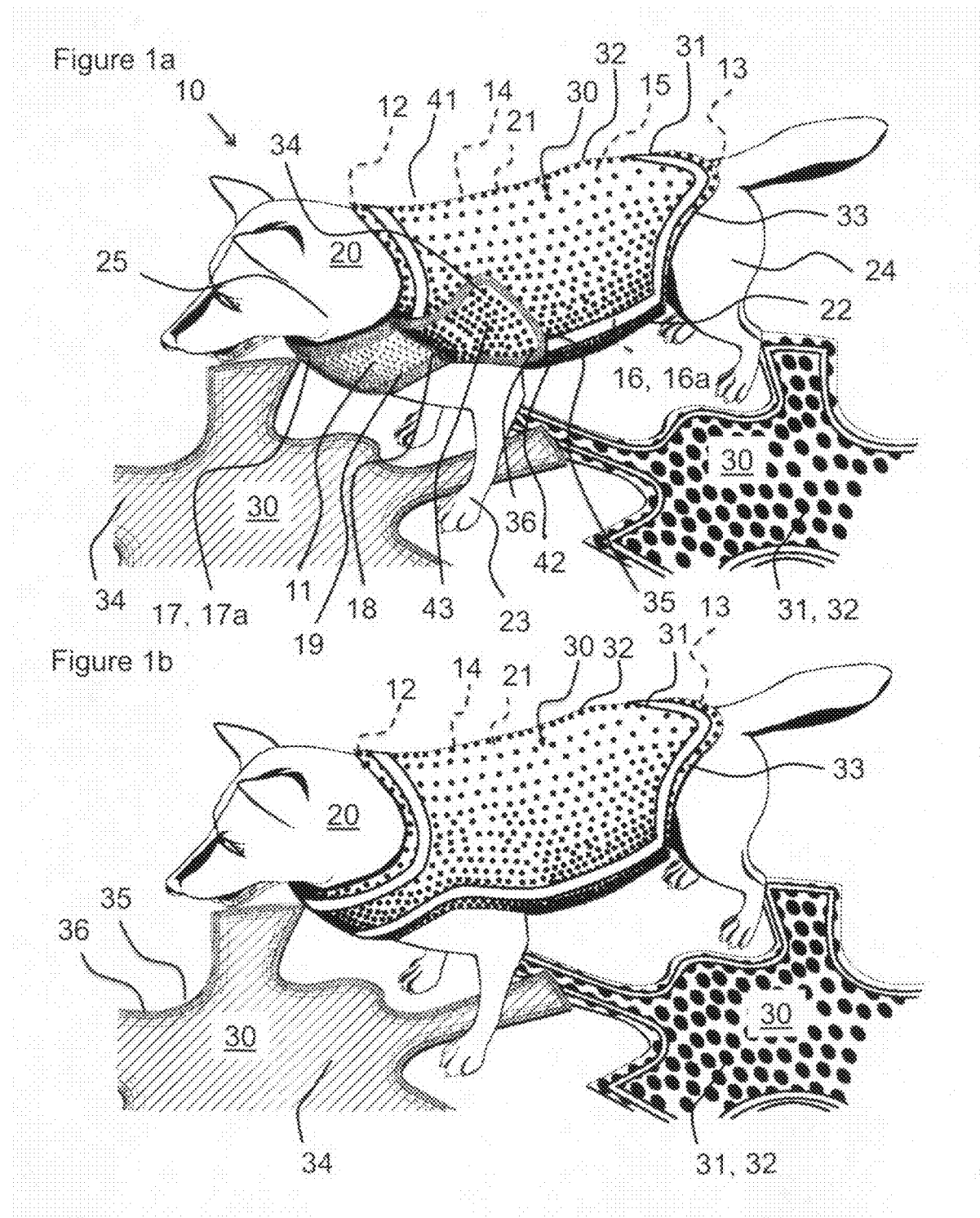

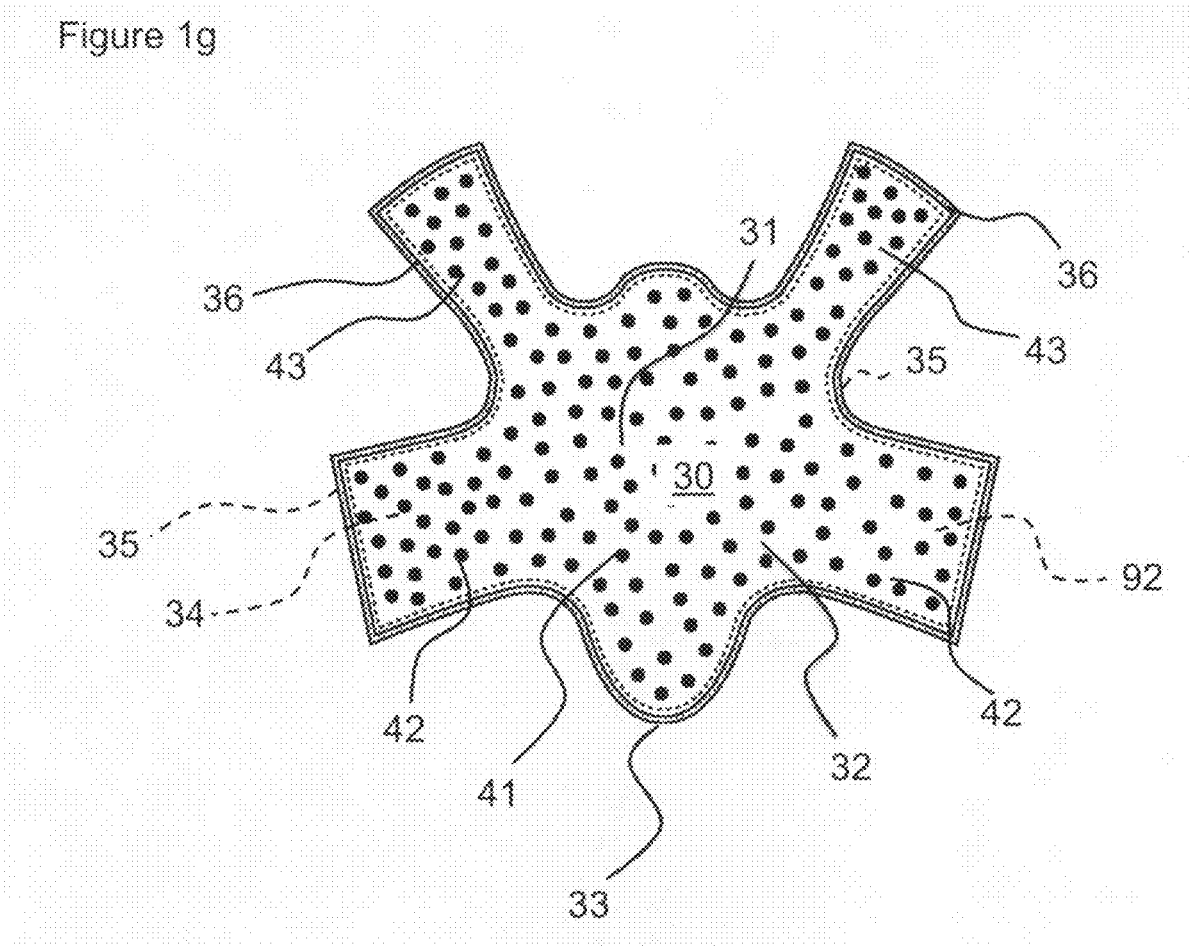

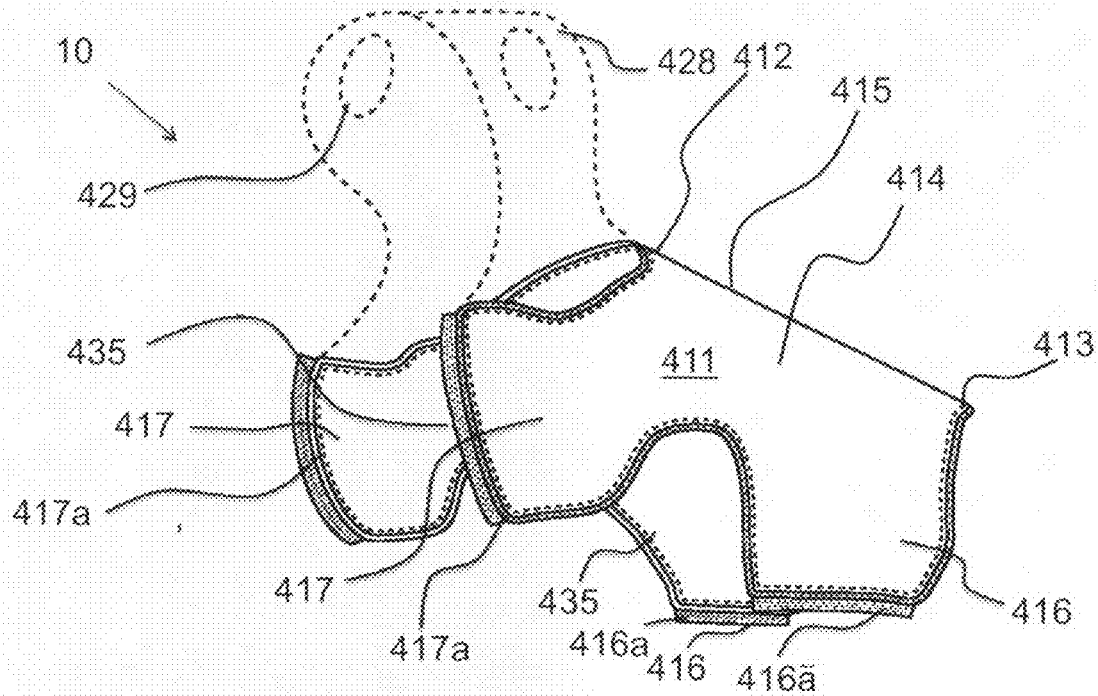
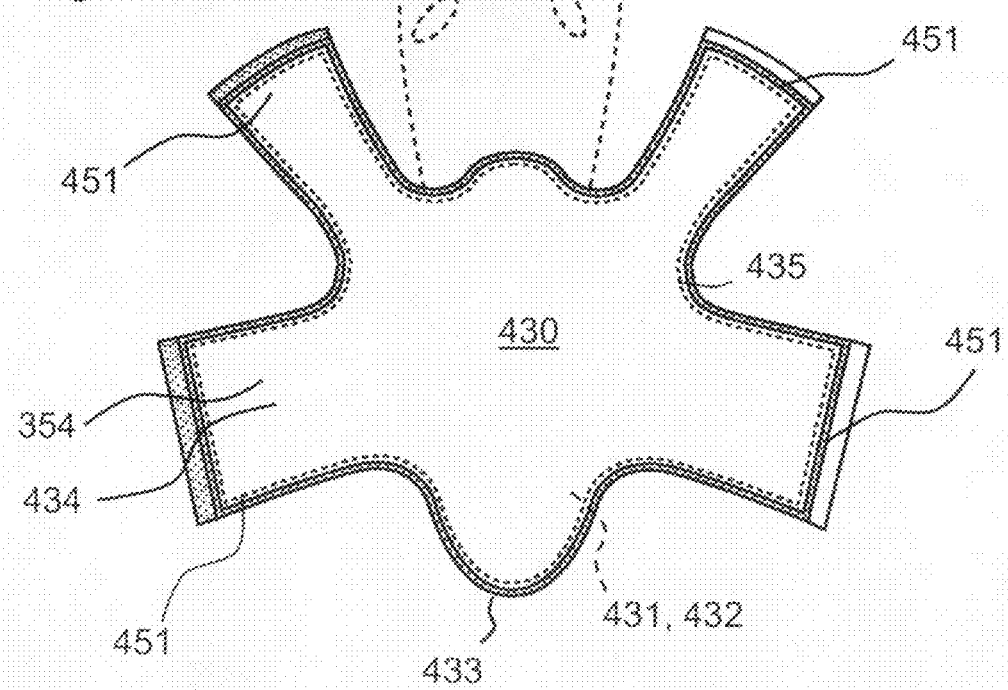

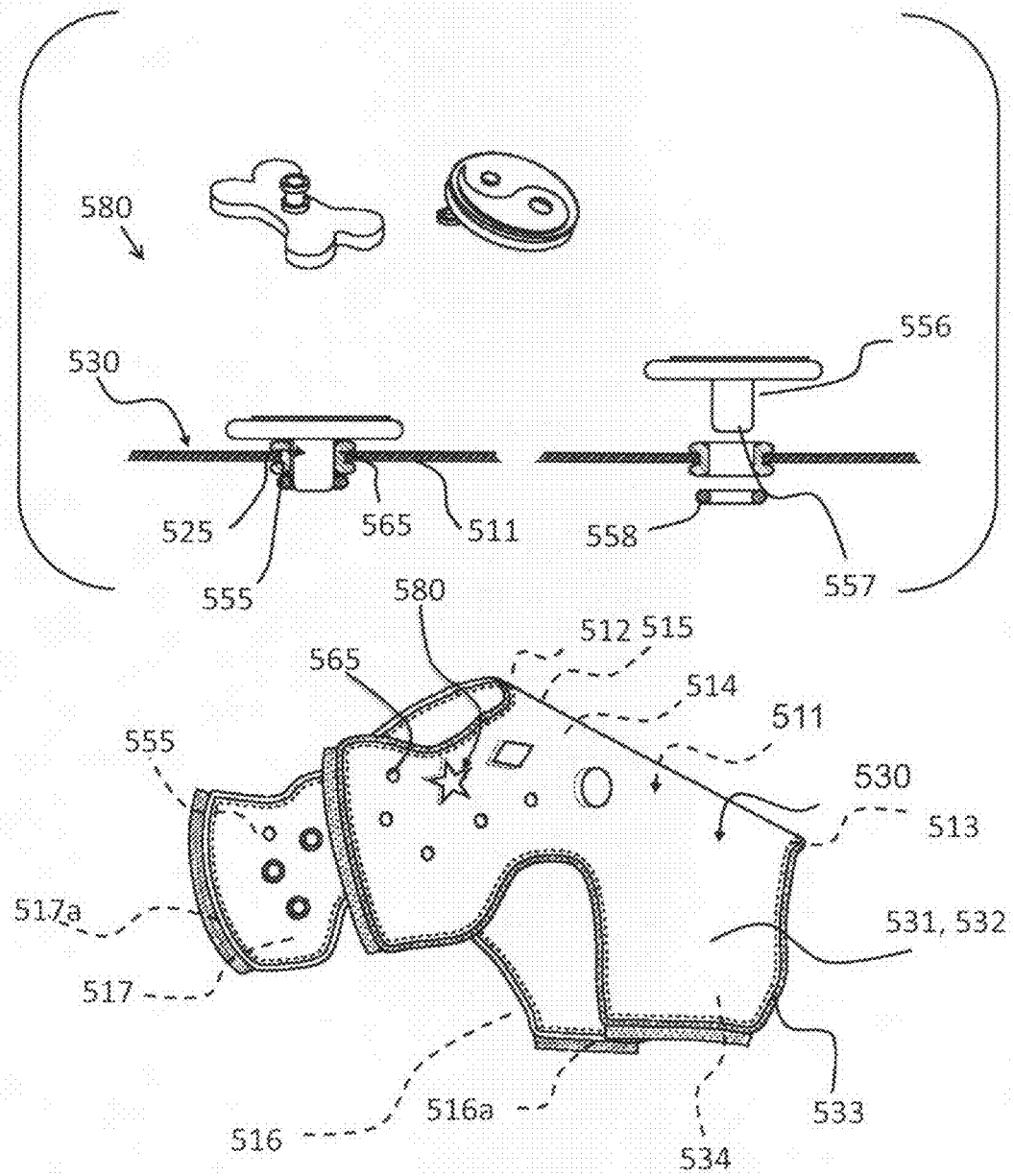

INTERCHANGEABLE ATTACHMENTS FOR ACCESSORIES FOR PETS

CROSS-REFERENCE TO RELATED APPLICATIONS

This application is a continuation-in-part of U.S. application Ser. No. 12/590,156, filed Nov. 3, 2009, for "Interchangeable Attachments For Accessories" which, in turn, is a continuation-in-part of U.S. application Ser. No. 12/460,705, filed Jul. 23, 2009, now U.S. Pat. No. 8,142,053 for "Interchangeable Attachments For Collars, Leashes, Belts And Accessories" which, in turn, claims the benefit of Provisional Application No. 61/215,370, filed May 4, 2009, the disclosures of which are hereby incorporated in their entirety by reference thereto.

BACKGROUND OF THE INVENTION

1. Field of the Invention

The present invention relates to interchangeable attachment accessories for pets; and more particularly, to interchangeable attachments having various designs, jeweled portions, LED and/or reflective properties, that are readily removably attached to articles such coats, jackets, sweaters, and the like, to provide aesthetic appeal and versatility and/or enhance visibility of the gear with which they are associated, thereby providing interchangeability of style and/or increasing user safety while walking in the vicinity of land vehicles during dusk or nighttime hours.

2. Description of the Prior Art

Pet owners frequently desire to dress their pets in fashionable outfits and gear. Other times, pets require gear or articles to be worn for protection from inclement weather or for warmth. Safety considerations can additionally be present, since walking a pet during dusk or nighttime hours can be hazardous in neighborhoods where automobiles are encountered. Illuminating characteristics of the automobile headlamps, generally afford an illumination range of approximately 25 to 50 feet. This illumination range can be significantly reduced by mist or fog, or bends in the road. Despite improvements to vehicle headlights, pedestrians, as well as pets and pedestrians walking pets, are oftentimes not recognized by automobile drivers until the distance between the automobile and the pedestrian or pet is small.

Several approaches devised by prior art workers attempt to provide solutions for safety concerns of pedestrians and pets. These approaches include 1) use of pet collars that are illuminated or reflective; 2) use of leashes which are illuminated or reflective; or 3) a combination of both features. None of these solutions suggests indicating the whereabouts of a pet owner, a leash and a pet attached to the leash, or a pedestrian or child via LED or reflective attachments appointed to removably attach to a lease, collar, or accessory, such as a backpack. Various types of illuminated dog collars using bulb or other powered sources are known in the art. These power-illuminated leashes require batteries, light bulbs or other lighting elements, and are not provided as decorative, removable attachments. For examples, see: U.S. Pat. Nos. 4,173,201; 4,513,692; 4,895,110; 4,887,552; 5,046,456; 5,140,946; 5,370,082; 5,429,075; 5,523,927; 5,535,106; 5,558,044; 5,630,382; 5,762,029; 5,850,807; 5,967,095; 6,170,968; 6,289,849; and 6,557,498. None of these power-illuminated leashes provides decorative, removable attachments. Dog collars, harnesses and leashes which include reflection capabilities are known in the art, but each fails to provide decorative attachments including reflective properties. For examples, see: U.S. Pat. Nos. 3,871,336; 3,999,521; and 4,167,156.

Beyond safety concerns, many individuals prefer to personalize their pet accessories, such as dog/cat coats, jackets, sweaters, or the like. Some decorative devices for leashes have been provided. However, the decorative devices fail to provide a plurality of decorative removable attachments, and further fail to provide the ability for an individual to readily change the decoration when desired. For examples, see: U.S. Pat. Nos. 5,363,809; 7,350,342; and 7,421,980. Various decorative interchangeable accessories have been provided for hair and jewelry for humans, however these interchangeable accessories are not provided for pets, and do not provide gear having interchangeable covers/attachments. Examples include: U.S. Pat. Nos. 6,688,316; 6,209,351; 6,189,542. Other interchangeable accessories have been provided for clothing, shoes and handbags for humans; but not for pets. Examples include: U.S. Pat. Nos. 5,803,266; 5,774,892; 6,971,424; and 4,263,951; and U.S. Patent App. Pub. Nos. 20090130954; 20090100714; and 20090044430. These devices fail to provide an interchangeable accessory wherein the article simply receives an interchangeable attachment to a central portion of the article. Nor do these devices provide an interchangeable accessory for pets.

Notwithstanding the efforts of prior art workers to construct decorative collars, leashes, belts and/or accessories, there is a need in the art for interchangeable attachments appointed to be removably attached to an article of pet gear, such as a pet coat, jacket, sweater, or the like. Additionally, there is a need in the art for interchangeable attachments having various designs, LED and/or reflective properties that are readily removably attached to a portion of an article of pet gear, such as a pet coat, jacket, sweater, or the like, to provide aesthetic appeal and/or to provide enhanced safety from vehicles during dusk or nighttime hours.

SUMMARY OF THE INVENTION

The present invention provides interchangeable attachments appointed to be removably attached to an article of pet gear, such as a pet coat, jacket, sweater, or the like. Interchangeability of accessory articles provides a means for allowing an individual to readily change the look of the pet article or pet gear. The interchangeable attachments have various designs, jeweled portions, LED and/or reflective properties that are readily removably attached to a portion of the article to provide aesthetic appeal and versatility and/or enhance visibility. A plethora of designs are provided on the show surface of the subject interchangeable attachments. Further, the show surface of the interchangeable attachments may have different textured appearances, such as smooth, silky, rough, leather, metallic or jeweled. In one embodiment the interchangeable attachments are presented as hook and loop fasteners and/or magnetic attachments. In one embodiment the interchangeable attachments are provided as to substantially cover the central section of the article to provide an interchangeable show surface and ultimately change the look of the article. In another embodiment the interchangeable attachments are provided as patches or swatches. In addition, the interchangeable portions may be provided as a kit wherein pluralities of interchangeable portions are provided.

The interchangeable attachment for an article comprises an article having a proximal end, distal end and a central section, wherein the article forms pet gear appointed to be worn by a pet. The central section of the article has at least one connection means appointed to receive at least one the interchangeable attachments. At least one interchangeable attachment is provided. The interchangeable attachment comprises a top wall having a show surface, side walls, and a back wall having a securing member adapted to engage with the connection means of the central section of the article for removably attaching the interchangeable attachment to the article.

In one embodiment, a plurality of holes are integrated in an article—preferably being a pet coat, jacket, sweater, vest, or the like—that are appointed to receive a decorative attachment. Correspondingly, the interchangeable attachment includes aligned holes therein. The decorative attachments may have a plethora of designs and may include an LED integrated therein, and/or reflective properties. Attachments may be created to accept the LED or any kind of Optics that are used for fun and to create a more visible pet or person. Attachments may also be constructed of vinyl or the like which can be readily used as a "canvas" that accepts markings such as drawings, colorations, doodles or the like. When these attachments overlay the body of the pet garment, they provide a unique way to personalize the pet garment. The attachments provided as LED buttons, optics, gems, or charms are to be inserted into the designed holes to create a more individual piece, while providing enhanced safety through increased visibility. Enhanced safety is not only afforded, but the attachments allow a user freedom of choice to design a creation of their own individual preference. Shapes, sizes and designs presented by the plethora of attachments are all different. Selection of the attachments as well as arrangement on the coat/jacket is uniquely determined by the person. Overlay jackets can be selected in accordance with weather conditions, to vary from overlay attachments that are light weight windbreakers that are water repellant to heavier, warmer, fleece-lined appliqués or the like. Optionally, the attachments can be designed through use of snap on buttons and are sold in a package containing at least one attachment, or more than one. The snap on attachments have a back piece that lays flat once inserted through the hole, or may have a ball like end that inserts and remains secure when in place, so the back portion of the attachment or LED or optic button/charm piece may vary in design. Alternatively, the attachment may be an independent piece retrofitted with a clip-like backing that holds it in place against the strap. The LED's and the optic light are used with a small watch battery, and last a long time, so battery life does not become a concern.

In one embodiment, the interchangeable attachment is provided as an interchangeable central section overlay which is appointed to be removably received over the central section of an article, so that the article is substantially covered with the interchangeable attachment. Preferably, mating hook and loop fastener portions (such as sold under the trademark VELCRO) are provided on the central overlay attachment and central section of the article. Preferably, the interchangeable/overlay attachments are sold with the article (pet coat, vest, sweater, jacket, shirt, poncho, etc.) to offer an alternative design. The interchangeable attachments may be sold separately from the article, and/or may be sold as a kit with a plurality of interchangeable attachments.

In operation, the user simply presses the interchangeable attachment to removably affix it to the central section of the article/pet gear/clothing, and a new look, function or design is created. For removal, the user simply peels the interchangeable attachment from the central section of the body of the article/pet gear/clothing. Reflective material or LED or fiber optics may be integrated within the interchangeable attachment for extra visibility when wearing. In another embodiment, the interchangeable attachments are comprised of a patch or swatch, and/or a plurality of patches or swatches. A kit may be provided including interchangeable appliqués, swatches, patches, designs, shapes, and/or elongated attachment strips.

A method of using an interchangeable attachment for an article is also provided, comprising the steps of: (1) placing an article on a pet, the article having a proximal end, distal end and a central section, wherein the article forms pet gear appointed to be worn by the pet, wherein the central section of the article has at least one connection means appointed to receive at least one interchangeable attachment; (2) selecting at least one interchangeable attachment to be worn on the central section of the article, the interchangeable attachment comprises a top wall having a show surface, side walls, and a back wall having a securing member adapted to engage with the connection means of the central section of the article for removably attaching the interchangeable attachment to the article; (3) attaching the interchangeable attachment onto the central section of the article; (4) wearing the article by the pet with the selected interchangeable attachment thereon; and (5) removing the interchangeable attachment from the article and replacing same with a different selected interchangeable attachment.

Additionally, a process for manufacture of an interchangeable attachment for an article is provided. The process includes the steps of: (1) forming the article comprising a proximal end, distal end and a central section, wherein the article forms pet gear appointed to be worn by a pet; (2) forming at least one connection means within the central section of the article, the connection means being adapted to receive the interchangeable attachment; and (3) forming the interchangeable attachment comprising a top wall having a show surface, side walls, and a back wall having a securing member adapted to engage with the connection means of the central section of the article for removably attaching the interchangeable attachment to the article.

Interchangeable attachments effectively temporarily alter the article's appearance and can provide safety and warmth to the pet and pet owner where LED, optics, or reflective properties, or glow-in-the-dark buttons are included features of the interchangeable attachments. One or more designer strip attachments can be applied to one or more portions of an interchangeable attachment to alter the appearance thereof. In operation, the interchangeable attachments are simply added-on to the article by engaging the connection means of the elongated region of the article with the securing member of the interchangeable attachments. When desired, the interchangeable attachment is simply removed from the article to once again change the look and/or feel thereof. There may also exist occasions where owing to changing temperatures, it would be preferable if a plurality of interchangeable attachments were utilized in a layered configuration. This is readily accomplished by placing connection means on either side of each interchangeable attachment. With this arrangement, several interchangeable attachments can be placed one on top of the other to produce the layered configuration. As temperatures rise, one or more of the layered attachments can be removed to provide a cooler arrangement. With falling temperatures, the additional interchangeable attachments can be placed in a layered fashion to provide added warmth for the pet. Interchangeable attachments can additionally include one or more water impermeable layers, which can be added or removed, depending on weather conditions.

In a further embodiment of the invention, one or more of the interchangeable attachments can be treated with insect repellent to protect the pet from insect bites, stings or the like. The outer attachment can additionally be constructed of an armor-type material, such as Kevlar®, or the like, to safeguard the pet during search and rescue missions, police work, armed forces activities, and the like.

BRIEF DESCRIPTION OF THE DRAWINGS

The invention will be more fully understood and further advantages will become apparent when reference is had to the following detailed description of the preferred embodiments of the invention and the accompanying drawings, in which:

FIG. 1a is a schematic view of an embodiment of the interchangeable attachment for an article, wherein the article is provided as a pet coat/jacket and the interchangeable attachment is being attached onto the article, and wherein the connection and securing member are located on the central section's shallow border and the interchangeable attachment's shallow rim;

FIG. 1b is a schematic view of the embodiment of FIG. 1a, wherein the interchangeable attachment is attached onto the article donned on a dog;

FIG. 1g is a top view of an embodiment of an interchangeable attachment detached from the article;

FIG. 4a is a top view of an alternative embodiment of an article, wherein the central section of the article is substantially covered with the connection means;

FIG. 4b is a bottom view of an alternative embodiment of an interchangeable attachment, wherein the interchangeable attachment's back wall is substantially covered with securing means appointed to be attached to the article of FIG. 4a;

FIG. 5 is a schematic view of an embodiment of the interchangeable attachment for an article, wherein the article is provided as a pet coat/jacket or shirt and both the article and the interchangeable attachment includes aligned holes appointed to receive a plurality of interchangeable button-type attachments.

DETAILED DESCRIPTION OF THE INVENTION

Figure 1C:
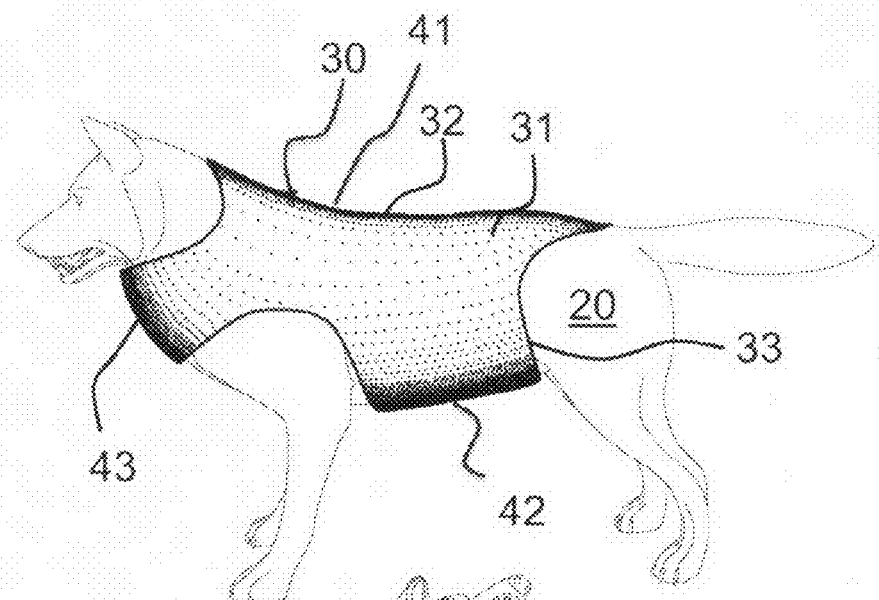
FIG. 1c is a top side view of the embodiment of FIG. 1b.

The present invention provides interchangeable attachments for an article, including pet gear such as a dog/pet coat, jacket, shirt, sweater or vest. The article includes a bodice portion with a collar closure and an under-ribcage closure to form an outfit appointed to be worn by a pet, such as a dog or cat. The article includes a proximal end, distal end and a central section having at least one connection means appointed to receive an interchangeable attachment. The interchangeable attachment includes a top wall having a show surface and a back wall having a securing member adapted to engage with the connection means of the article for removably attaching the interchangeable attachment to the article.

The interchangeable attachment provides the ability of the pet owner to change-up the pet article/gear to provide a different show surface. In one embodiment both the article and the interchangeable attachment have aligned holes appointed to receive interchangeable button-type attachments enabling the pet owner to further accessorize the article/pet gear. The interchangeable attachments have a plethora of designs and may include LED, fiber optic and/or reflective properties to provide both aesthetic appeal and enhance safety during dusk or nighttime hours.

The interchangeable attachments for pet gear including pet coats, jackets, sweaters, shirts, vests, ponchos, and the like provides various designs, jeweled portions, LED and/or reflective properties, that are readily removably attached to the article to provide instant aesthetic appeal and versatility and/or enhance visibility of the gear as it is being worn. Changing the look of the article with just a "swap" of an overlay is afforded with simple application of the interchangeable attachment. The interchangeable attachments are constructed with mating fastening mechanisms, including for example hook and loop fasteners such as are sold under the trade name VELCRO. They may also be interchangeably attached by a mating fastening mechanism that contains magnetic portions. These mating fasteners are integrated into the article itself, which provides a universal base; and are also integrated into the interchangeable attachments that are overlaid onto the universal article/base. Positioning of the interchangeable attachment/overlay piece is simple. Incorporating hook and loop material into the interchangeable accessory components not only facilitates removable attachment of the interchangeable attachment, but also facilitates indication of the exact positioning of the attachment/overlay (appliqué). Preferably, hook and loop fasteners are utilized. In the alternative, snaps, hooks, buttons or other mechanical devices for fasteners may be utilized, as well as adhesive materials.

Materials for the universal article/pet gear as well as for the interchangeable attachments or interchangeable appliqué/overlay may vary in design and texture. Colors, textures, designs, shapes, and/sizes of the interchangeable attachments can vary, along with materials used to manufacture same. Gem stones can be added, reflective threads, material. A light source, such as LED or fiber optics or the like, may be incorporated within the design of the interchangeable attachments, which can be in communication with a power source. The power source may comprise a battery in communication with an on/off switch or a motion sensor or light sensor. An electroluminescent light can be housed under the top wall of the interchangeable attachment to provide the pet gear with transparent properties at the location of the light so that light is emitted. Preferably, the side walls of the interchangeable attachment include transparent portions for the emission of light. An LED may be attached to a battery housed within the interchangeable attachment. The LED and the optic light are used with a small watch battery, and last a long time, so battery life does not become a concern. The LED (or fiber optic light) may be turned on by initiating a power switch thereby closing a circuit. Or the LED may be turned on by a motion sensor or by way of a light sensor so that the light is not turned on unless there is motion or it is dark out, thereby preserving battery life.

Alternatively, the show surface of the interchangeable attachment may include reflective properties. This has significant application when applied to the pet gear article. Since pets are frequently walked during early morning hours and during dusk, the presence of a show surface containing reflective properties imparts an added measure of safety to both the pet and the pet owner/caregiver. Preferably, reflectivity is provided by the incorporation of retroreflective corner cube reflectors or microsphere reflective elements thermally bonded onto a strip that is bonded onto the top side of the interchangeable attachment to yield a reflective show surface thereto. Preferably, reflectivity is provided via a plurality of glass reflective elements or beads bonded to the show surface. With this arrangement, a large portion of light emitted from a light source is reflected back to the light source, so that the pathway for the angle of reflection of the light is substantially the same as the pathway for the angle of incidence. With this structure, the show surface reflects a significant quantum of the incident light from a car head light or other light emitting element back to the source. Reflectivity may be provided via corner cube prismatic or microsphere geometry bonded onto the show surface. These transparent retroreflective elements may be made from high refractive index transparent materials such as barium oxide-titanium oxide containing glasses. They exhibit a refractive index in the range of 1.9 to 2.2. Preferably, abrasion resistance properties are provided to the reflective show surface by applying a transparent coating onto the show surface of the interchangeable attachment. One such coating comprises a polymer that is transparent, flexible and has a refractive index significantly smaller than that of the retroreflective elements used. For example, thermosetting resin compositions such as two-component polyurethane may be painted or sprayed over the reflective show surface. Thermoplastic aliphatic thermoplastic polyurethanes are preferred as compared to aromatic urethanes because of their transparency, resistance to dirt build-up, flexibility, and ultraviolet radiation degradation resistance. Typically, aliphatic polyurethane has the structure [—O—(CH(CH$_3$)CH2O$_{20}$—C(O)—NH—R—NH—C(O)—]; or [—O—(CH$_2$—CH$_2$CH$_2$CH$_2$—O—)$_{10}$—C(O)—NH—R—NH—C(O)—], where R is a non-aromatic group. The thickness of the transparent abrasion resistant coating is in the range of 0.002 to 0.010 inches. The coating has a refractive index significantly lesser than that of retroreflective elements bonded or sewn onto the reflective strip can be bonded or sewn onto the show surface of the interchangeable attachment. The reflective strip, itself, can vary in size, shape and placement. Typically the retroreflective elements have a refractive index of 1.9 to 2.2 and the flexible transparent abrasion resistant polymeric coating has a refractive index of 1.3 to 1.55. A 0.002 to 0.010 inch layer of transparent flexible abrasion resistant polymeric coating does not affect the path of normally incident incoming light beam. With such a coating alteration of the path of inclined incident light beam is minimal. Similarly, the reflected light beam path is not severely affected. The internal reflection property of the retroreflective elements is not deteriorated since the abrasion resistant coating has significantly lower refractive index, as compared to that of the retroreflective elements.

Moreover, the article may include water resistant properties appointed for substantially keeping the pet dry during inclement weather. Water resistant properties may be achieved through the application of a water repellant coating/ outer layer on the exterior surface of the article. The water resistant outer layer may include a thin polymeric coating, or wax film coating. Alternatively, other materials including polymeric material, nylon, neoprene materials or combinations thereof may be used to construct the article. Most preferably, water resistant properties are integrated within the construction of at least one interchangeable attachment, so that the pet owner can simply change out a fashionable interchangeable attachment to a water resistant attachment when the weather is rainy, snowy, misty or otherwise inclement. In this manner, the interchangeable attachment is either constructed of a polymeric, nylon, neoprene or silicone material or includes an outermost layer constructed of same, or with a water repellant coating of same.

The article's central section may be decorative in and of itself, so that it can optionally be worn by the pet without application of an interchangeable attachment overlay. In this manner, the pet owner has the option of foregoing the interchangeable attachment—and a separate wearable outfit is provided allowing more versatility. Additionally, the article may include an insulated inner layer for substantially keeping the pet warm in cold weather. The insulated layer is preferably formed from a type of synthetic fiber thermal insulation used in clothing, such as that sold under the trade name Thinsulate® by 3M® Corporation. Cotton, silk, polyester, down and/or synthetic fibers may be used to provide the insulated layer. Thinsulate® has advantages in use as it provides a thin layer yielding high insulating properties, thus minimizing bulkiness of the article due to the increased density of the fibers with decreased size of fibers. The insulation properties are beneficial for retaining some of the heat produced by the body for comfortable warmth while the moisture produced, e.g. by sweating, is supposed to evaporate.

Alternatively, instead of/or in addition to the article having insulating properties, the interchangeable attachment overlay may have insulating properties via a thin insulating layer. Again the insulated layer is preferably formed from a type of synthetic fiber thermal insulation used in clothing, such as that sold under the trade name Thinsulate® by 3M® Corporation. In this manner, the article can simply be worn as a light jacket in moderate temperatures, while an insulated interchangeable attachment can be attached to the article during colder temperatures; or during inclement rainy weather, a water proof interchangeable attachment can be attached to the article. Advantageously, the interchangeable attachments do not only provide the ability for the pet owner to change the look of the article; but the attachments also provide the ability for the user to provide additional warmth or water protection during cold or wet weather.

Figure 1D:
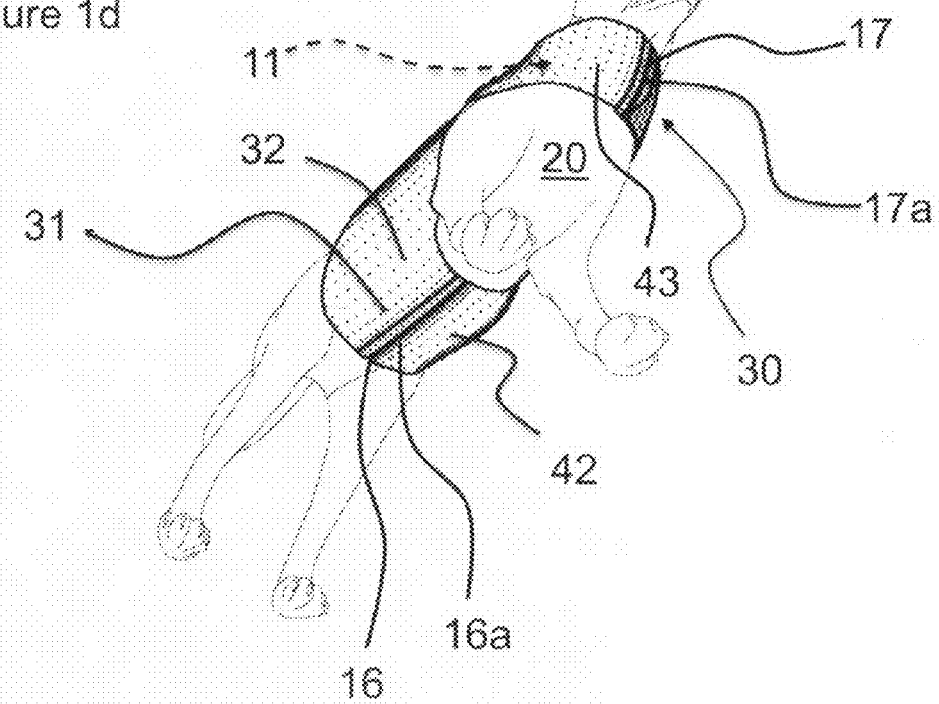
FIG. 1d is a bottom view of FIG. 1b.
Figure 1E:
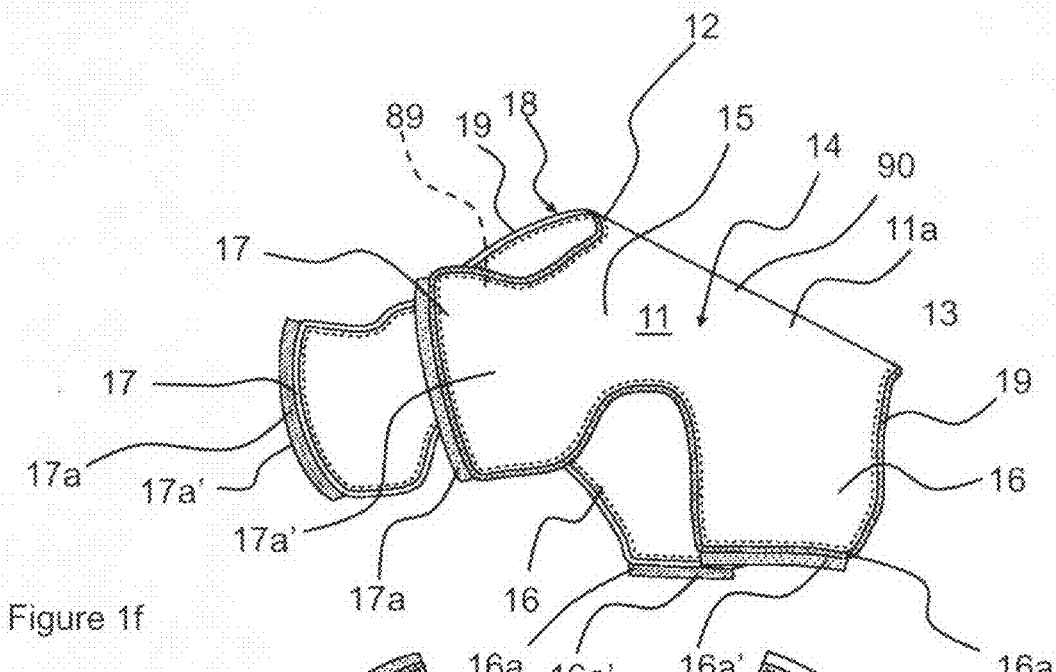
FIG. 1e is a top view of the article—coat without the interchangeable attachment.
Figure 1F:
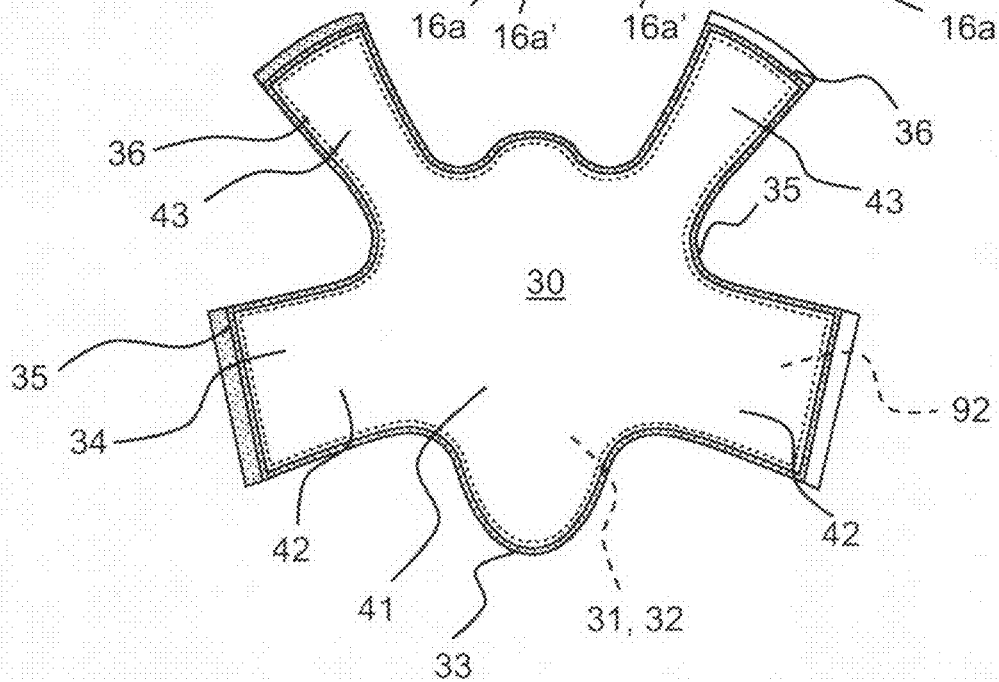
FIG. 1f is a bottom view of the interchangeable attachment detached from the article.

FIGS. 1a-1g show schematic views of a first embodiment of the interchangeable attachment for an article. In the embodiment shown in FIGS. 1a-1g the article is provided as a pet coat/jacket/shirt/sweater—pet outfit in general—and wherein the connection and securing members are located on the central section's shallow border and the interchangeable attachment's shallow rim, respectively. FIG. 1a is a schematic view of the interchangeable attachment being attached onto the article at the connection and securing member interface located on the central section's shallow border and the interchangeable attachment's shallow rim, respectively. FIG. 1b is a schematic view of the embodiment of FIG. 1a, wherein the interchangeable attachment is attached onto the article donned on a dog. FIG. 1c is a top side view of the embodiment of FIG. 1b, and FIG. 1d is a bottom view of FIG. 1b. FIG. 1e is a top view of the article—coat without the interchangeable attachment. FIG. 1f is a bottom view of the interchangeable attachment detached from the article. FIG. 1g is a top view of an embodiment of an interchangeable attachment detached from the article.

Referring to FIGS. 1a-1g, the interchangeable attachment for an article 10 generally comprises an article 11 and at least one interchangeable attachment 30 that removably attaches to the article 11. As best illustrated in FIGS. 1a, 1d and 1e, article 11 has a proximal end 12, distal end 13 and a central section 14. The article 11 is formed as pet gear appointed to be worn by a pet/dog 20. The pet gear can be constructed as a plethora of different outfits/gear, including as a pet coat, jacket, shirt, sweater, vest, hood, poncho, or the like, having a generally similar construction. Article 11 is herein shown having a pet coat construction wherein the central section 14 is constructed to form a top segment 15, an underside segment 16 with a closure 16a and a front segment 17 with a collar closure 17a, each having mating fastener means 16a' and 17a'. Correspondingly, the interchangeable attachment 30 is preferably formed having a like structure so that it aligns with and interchangeable attaches to the article 11, substantially covering the central section 14 (best illustrated by FIGS. 1f and 1g). That is, the interchangeable attachment 30 is correspondingly formed having an upper segment 41, an under segment 42 and a front segment 43 so that the interchangeable attachment 30 substantially covers the article 11 when attached thereon. Preferably the interchangeable attachment 30 does not include closure on the under segment 42, nor a collar closure on front segment 43 as donning of the outfit onto the pet is achieved by way of the article's 11 closures 16a, 17a.

Referring back to FIGS. 1a and 1e, as constructed, top segment 15 covers a back torso 21 of dog 20, while underside segment 16 extends over and under a ribcage area 22 of dog 20 and closure 16a closes under ribcage area 22 between front and back leg quarters, 23, 24 as illustrated in FIGS. 1a and 1b. Front segment 17 with collar closure 17a is appointed to attach under the dog's neck 25 in the chest region. The underside closure 16a and the collar closure 17a each include two-part fastener means 16a', 17a' (best illustrated in FIG. 1e). The article 11 may further include a hood portion (not shown, see FIG. 4a).

Furthermore, the article may include an insulated inner layer 89 for substantially keeping the pet warm in cold weather (best illustrated in FIG. 1e). The insulated layer 89 is preferably formed from a type of synthetic fiber thermal insulation used in clothing, such as that sold under the trade name Thinsulate® by 3M® Corporation. Cotton, silk, polyester, down and/or synthetic fibers may be used to provide the insulated layer. Besides, the article may include water resistant properties appointed for substantially keeping the pet dry during inclement weather. Water resistant properties may be achieved through the application of a water repellant coating/outer layer 90 on the exterior surface of the central section 14 of article 11. The water resistant outer layer may include a thin polymeric coating, or wax film coating. Alternatively, other materials including polymeric material, nylon, neoprene materials or combinations thereof may be used to construct the article.

Central section 14 of article 11 has at least one connection means 18 appointed to receive at least one of the interchangeable attachments 30. Herein, connection means 18 is provided as a circumferential band outlining the central section 14 of the article. That is to say, central section 14 comprises a shallow border 19 whereon connection means 18 is located. Preferably shallow border 19 has a depth ranging between 0.25"-2", most preferably having a depth ranging between 0.5'-1". What is more, connection means 18 is preferably located on spaced segments on shallow border 19. In this manner the user needs to only simply attach the interchangeable attachment 30 at these locations. Most preferably, connection means 18 substantially or entirely covers the shallow border 19 (as shown in FIG. 1e) so that the interchangeable attachment 30 is seamlessly secured onto the article 11. In this manner, there are no gaps or openings along shallow border 19 as the interchangeable attachment 30 is snuggly secured all along the periphery of the article 11 at the shallow border 19.

As best illustrated in FIGS. 1a, 1d and 1g, interchangeable attachment 30 comprises a top wall 31 having a show surface 32, side walls 33, and a back wall 34. Back wall 34 includes a securing member 35 integrated therein. Securing member 35 is adapted to engage with connection means 18 of central section 14 of article 11 for removably attaching interchangeable attachment 30 to article 11 as shown in FIGS. 1a-1d. In the embodiment shown in FIGS. 1a-1g, connection means 18 of central section 14 of article 11 is shown on shallow border 19. Thus, correspondingly, back wall 34 of interchangeable attachment 30 includes a shallow rim 36 whereon securing member 35 is located. Shallow rim 36 and securing member 35 on interchangeable attachment 30 is constructed to align with shallow border 19 and connection means 18 on article 11 so that the interchangeable attachment neatly attaches to article 11. Connection means 18 and securing member 35 preferably comprise mating hook and loop fasteners, such as are sold under the trade name VELCRO®. Alternatively, connection means 18 and securing member 35 comprise mating magnetic fastener portions integrated within article 11 and interchangeable attachment 30—either provided as a continuous strips or as segment strips spaced apart by a distance ranging from 1"-3".

Interchangeable attachment 30 overlay may have insulating properties via a thin insulating layer 92 (see FIG. 10. Insulated layer 92 is preferably formed from a type of synthetic fiber thermal insulation used in clothing, such as that sold under the trade name Thinsulate® by 3M® Corporation. In this manner, the article 11 can simply be worn as a light jacket in moderate temperatures, while insulated interchangeable attachment 30 can be attached to article 11 during colder temperatures; or during inclement rainy weather, a water proof interchangeable attachment 30 can be attached to the article 11.

Figure 2:
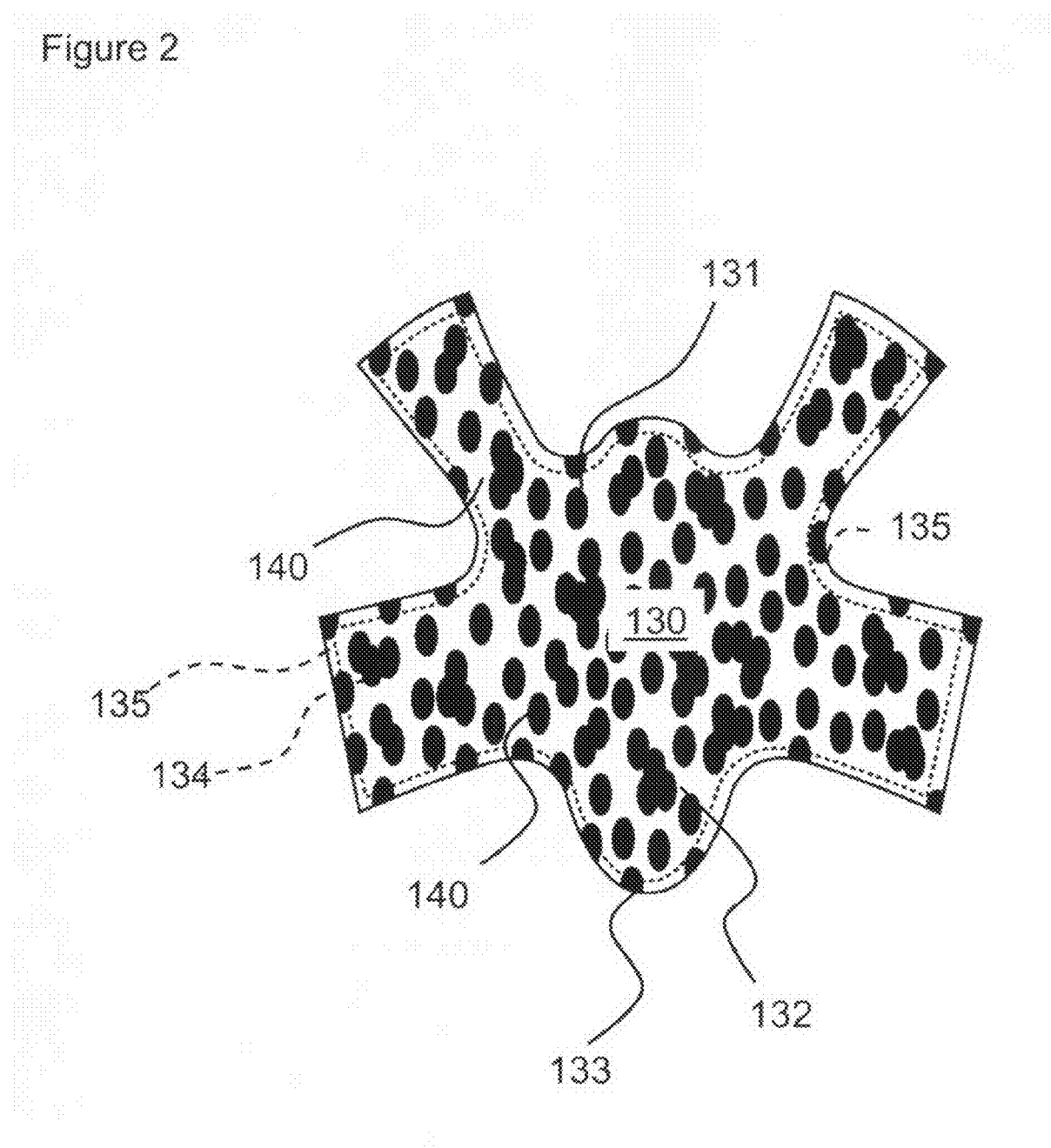
FIG. 2 is a top view of an embodiment of an interchangeable attachment detached from the article, wherein the attachment includes reflective properties.

FIG. 2 illustrates a top view of an embodiment of an interchangeable attachment detached from the article, wherein the attachment includes reflective properties. Reflective interchangeable attachment 130 comprises a top wall 131 having a show surface 132, side walls 133, and a back wall 134. Back wall 134 includes a securing member 135 integrated therein adapted to engage with connection means of an article of pet gear for removable attachment. Top wall 131 includes narrow width reflective strips or shapes 140. Preferably reflective strips or shapes 140 are braided into the fibers of top wall 131 so that virtually the entire top wall 131 includes reflective properties. Although the embodiment shown illustrates reflective oval shapes 140, reflective strips can be provided as small segments or as part of a design, or indicia.

Figure 3:
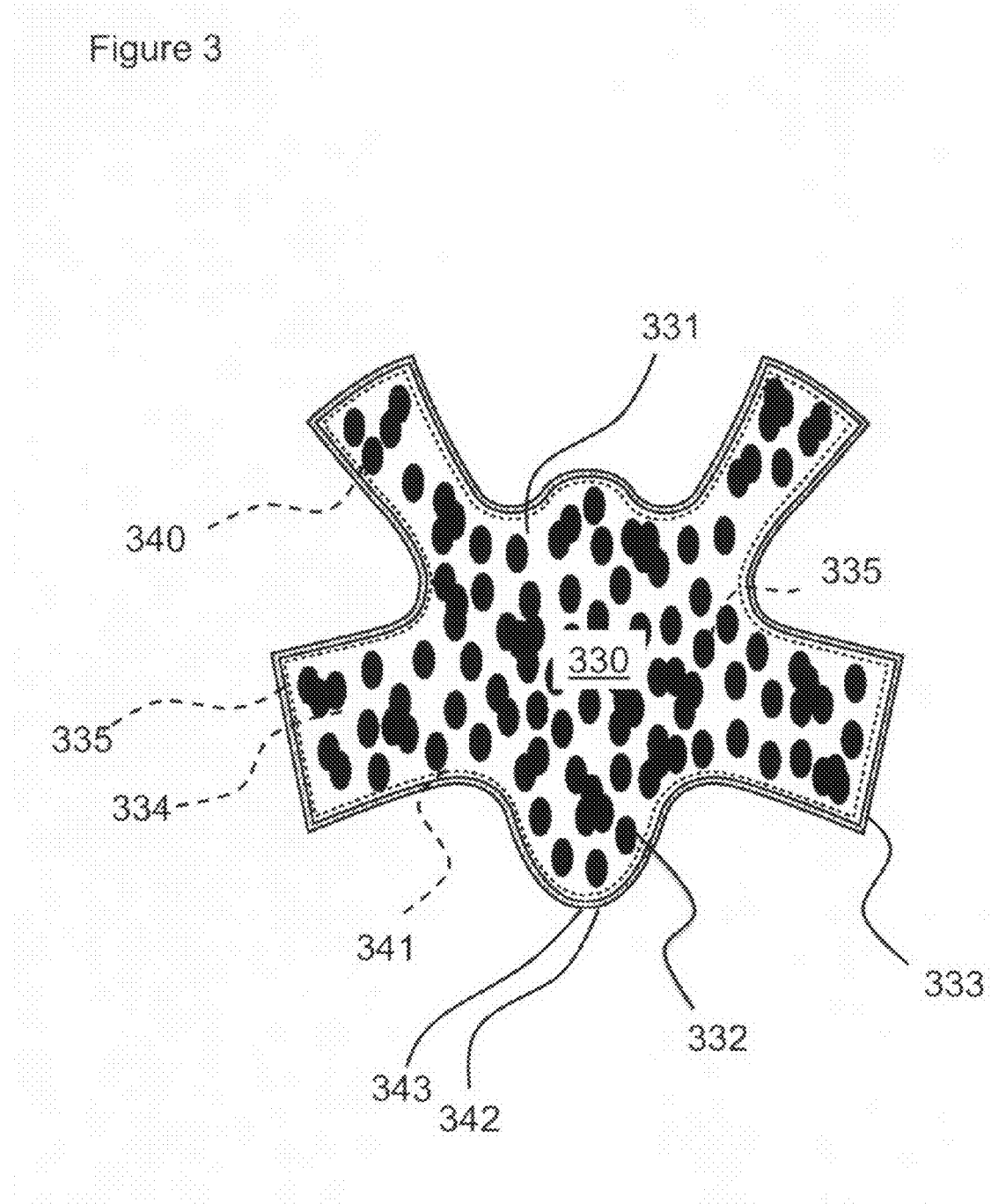
FIG. 3 is a top view of an embodiment of an interchangeable attachment detached from the article, wherein the attachment includes light emitting properties, LED and/or fiber optics.

FIG. 3 shows a top view of an embodiment of an interchangeable attachment detached from the article, wherein the attachment includes light emitting properties, LED and/or fiber optics. Light emitting interchangeable attachment 330 comprises a top wall 331 having a show surface 332, side walls 333, and a back wall 334. Back wall 334 includes a securing member 335 integrated therein adapted to engage with connection means of an article of pet gear for removable attachment. Located between top wall 331 and back wall 334 is a LED or fiber optic light shape 340. Preferably, light shape 340 is aligned with a transparent strip 341 integrated within show surface 332 and top wall 331. Light shape 340 is in communication with a power source, such as a wire battery 342, or a watch battery (not shown) that is inserted in to the lining of the attachment, and which is activated by touch. The wire battery is engaged in the on position either by way of a power switch 343 or by a light sensor.

An interchangeable attachment kit may be provided with a single universal article. The kit shall include a plurality of interchangeable attachments, each having varying show surfaces and/or functions. For example, a kit may include an article and at least one interchangeable attachment having functional features such as: (i) water proof properties, (ii) insulating properties, (iii) light emitting properties, (iv) reflective properties—and/or combinations of each of these features. Likewise, the kit may include a plethora of decorative interchangeable attachments having jewels, beads, glitter, or other fashionable features—along with any combination of functional features.

Figure 4C:
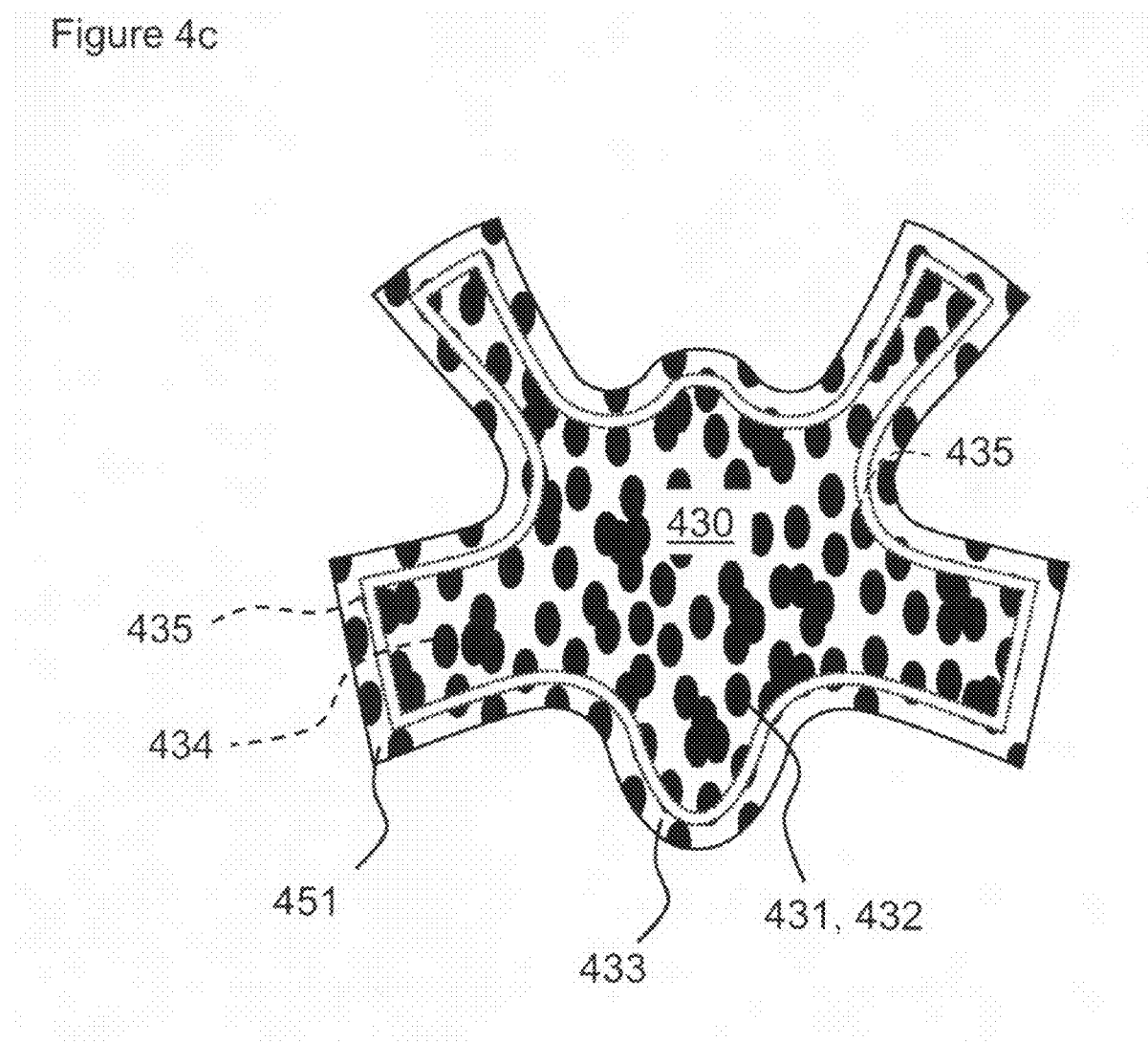
FIG. 4c is a top view of an alternative embodiment of the interchangeable attachment of FIG. 4b.

FIGS. 4a-4c illustrates views of an alternative embodiment of an article, wherein the central section of the article is substantially covered with the connection means. Specifically, FIG. 4a is a top view; FIG. 4b is a bottom view of an alternative embodiment of an interchangeable attachment; FIG. 4c is a top view of the alternative embodiment of the interchangeable attachment.

Referring to FIGS. 4a-4c, the interchangeable attachment for an article 410 generally comprises an article 411 (FIG. 4a) and at least one interchangeable attachment 430 (FIG. 4b). Referring to FIG. 4a, article 411 has a proximal end 412, distal end 413 and a central section 414. The article 411 is formed as pet gear appointed to be worn by a pet. Article 411 is herein shown having a pet coat construction wherein the central section 414 is constructed to form a top segment 415, an underside segment 416 with a closure 416a and a front segment 417 with a collar closure 417a. Correspondingly, the interchangeable attachment 430 is preferably formed having a like structure so that it aligns with and interchangeable attaches to the article 411, substantially covering the central section 414. The article 411 may further include a hood portion 428 with ear cut-outs 429. Central section 414 of article 411 has at least one connection means 418 appointed to receive at least one of the interchangeable attachments 430. Interchangeable attachment 430 comprises a top wall 431 having a show surface 432, side walls 433, and a back wall 434. Back wall 433 includes a securing member 435 integrated therein adapted to engage with connection means 418 of central section 414 of article 411 for removabley attaching interchangeable attachment 430 to article 411. Tabs 451 may be provided for grasping interchangeable attachment 430 when removing the attachment 430 from the article 411. Tabs 451 may include a frictional surface, such as a polymeric or silicon coating or bubbles, to provide greater grasping ability when pulling off the interchangeable attachment 430.

In the embodiment shown in FIGS. 4a-4c, connection means 416 of article 411 is shown substantially covering central section 414. Correspondingly, securing member 435 of interchangeable attachment 430 substantially covers back wall 433. In this manner, interchangeable attachment 430 substantially adheres to article 411 in a flush manner yielding virtually zero gaps between the back wall 433 and central section 414 of the interchangeable attachment 430 and article 411. Connection means 416 and securing member 435 preferably comprise mating hook and loop fasteners, such as are sold under the trade name VELCRO®. Alternatively, connection means 416 and securing member 435 comprise mating magnetic fastener portions integrated within article 411 and interchangeable attachment 430—either provided as a continuous strips or as segment strips spaced apart by a distance ranging from 1"-3". In yet another embodiment, the connection means 418 and securing member 435 are provided as sections located on the central section 414 and back wall 433 of the article 411 and interchangeable attachment 430, respectively, rather than as a complete covering of those sections.

FIG. 5 is a schematic view of an embodiment of the interchangeable attachment for an article, wherein the article is provided as a pet coat/jacket or shirt and the article and/or the interchangeable attachment includes aligned holes appointed to receive a plurality of interchangeable button-type attachments. The interchangeable attachment for an article generally comprises an article 511, formed as a pet outfit, and at least one interchangeable attachment 530. Article 511 has a proximal end 512, distal end 513 and a central section 514 having connection means for attaching the interchangeable article 511 onto an animal/pet. Article 511 is herein shown having a pet coat construction wherein the central section 514 is constructed to form a top segment 515, an underside segment 516 with a closure 516a and a front segment 517 with a collar closure 517a. Interchangeable attachment 530 comprises a top wall 531 having a show surface 532, side walls 533, and a back wall 534 with a securing member integrated therein adapted to engage with connection means for removable attachment. A plurality of holes 555 are integrated in the article 511. Corresponding, a plurality of holes 565 are also integrated in said interchangeable attachment 530 which align with holes 555 of the article 511. At least one secondary interchangeable attachment or decorative attachment 580/button type attachment is provided that is appointed to be received within said holes 555, 565. Secondary interchangeable attachment 580 is constructed having a securing member 525 comprising a shaft portion 556 with a shaft end 557. Shaft portion 556 is received and housed within the apertures 555, 565 so that the secondary interchangeable attachment 580 is removably attached. A locking cap 558 may be provided that is appointed to receive shaft end 557 of the shaft portion 556. Alternatively, securing member 525 of the secondary interchangeable attachment 580 comprises a shaft portion 556 with a shaft end 557 formed as a bulbous portion (not shown) having a bulbous diameter slightly greater than the apertures' 555, 565 diameters. For ease of insertion into apertures 555, 565, preferably the bulbous portion of the interchangeable attachment 580 is composed of a flexible or deformable material. The secondary interchangeable attachment 580/button add-on attachment may include light emitting properties wherein an LED light is integrated into the button 580 and a battery source is connected thereto in shaft 556 which provides power to the LED when activated either by an on/off power switch or by way of a light sensor.

Figure 6:
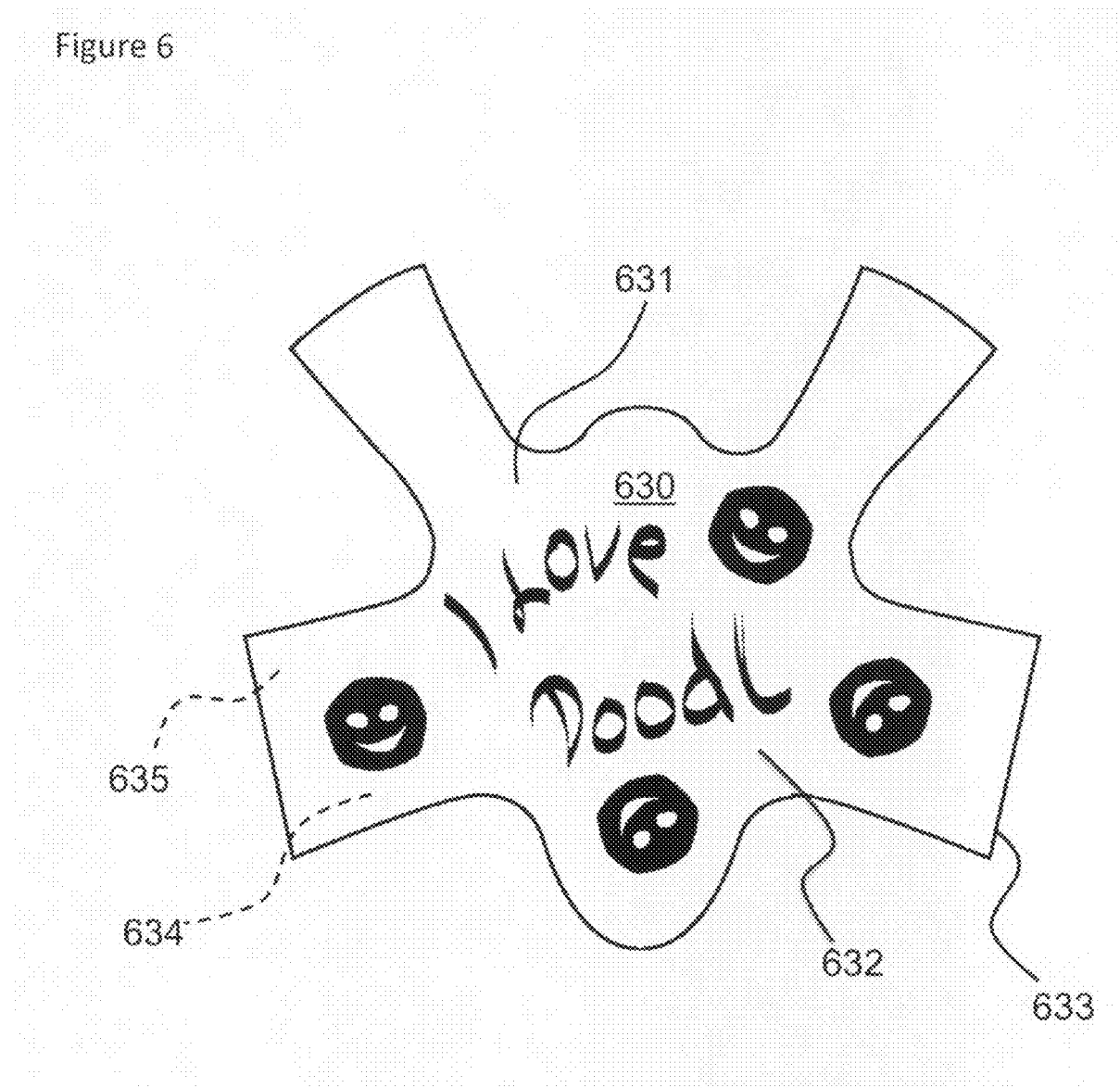
FIG. 6 shows a top view of an embodiment of an interchangeable attachment detached from the article, wherein the attachment includes a designable surface.

FIG. 6 shows a top view of an embodiment of an interchangeable attachment detached from the article, wherein the attachment includes a designable surface. Designable surface interchangeable attachment 630 comprises a top wall 631 having a show surface 632, side walls 633, and a back wall 634. Back wall 634 includes a securing member 635 integrated therein adapted to engage with connection means of an article of pet gear for removable attachment. Top wall 631 and show surface 632 is provided so that a pet owner can doodle or draw on the surface 632 in order to design the interchangeable attachment 630 in their own unique way. This can be achieved by constructing the show surface 632 with a polymeric coating or eraser board type material so that the user can draw on surface 632 with dry erase markers, semi-permanent or permanent markers, brushes, or the like. Glitter can be added using spray-glue, Elmer's glue; and decals can be affixed thereto to create a personalized outer-coat for the pet.

An interchangeable attachment kit may be provided with a single universal article. The kit shall include a plurality of interchangeable attachments, each having varying show surfaces and/or functions. For example, a kit may include an article and at least one interchangeable attachment having functional features such as: (i) water proof properties, (ii) insulating properties, (iii) light emitting properties, (iv) reflective properties—and/or combinations of each of these features, and/or (v) doodling applications wherein the pet owner can draw or incorporate his/her own designs into the attachment. Likewise, the kit may include a plethora of decorative interchangeable attachments having jewels, beads, glitter, or other fashionable features—along with any combination of functional features.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. An interchangeable attachment for an article, comprising:
   a. said article having a proximal end, distal end and a central section, wherein said article forms pet gear appointed to be worn by a pet;
   b. said central section of said article having at least one connection means appointed to receive at least one said interchangeable attachment;
   c. said interchangeable attachment comprising a top wall having a show surface, side walls, and a back wall having a securing member adapted to engage with said connection means of said central section of said article for removably attaching said interchangeable attachment to said article; and
   d. said article forming pet gear comprising a pet coat, jacket, vest, shirt or sweater.

2. An interchangeable attachment for an article as recited by claim 1, wherein said show surface of said interchangeable attachment includes reflective properties.

3. An interchangeable attachment for an article as recited by claim 1, wherein said show surface of said interchangeable attachment includes a gemstone, decorative glass or other decorative design piece attached thereto.

4. An interchangeable attachment for an article as recited by claim 1, wherein said show surface of said interchangeable attachment includes an electroluminescent light integrated therein.

5. An interchangeable attachment for an article as recited by claim 1, wherein said show surface of said interchangeable attachment includes fiber optics integrated therein.

6. An interchangeable attachment for an article as recited by claim 1, wherein at least a portion of each of said securing member and said connection means of said interchangeable attachment and said central section of said article, respectively, includes mating hook and loop fasteners.

7. An interchangeable attachment for an article as recited by claim 1, wherein at least a portion of each of said securing member and said connection means of said interchangeable attachment and said central section of said article, respectively, include mating magnetic fasteners.

8. An interchangeable attachment for an article as recited by claim 1, wherein said connection means of said central section substantially covers said central section of said article and wherein said securing member substantially covers said back wall of said interchangeable attachment.

9. An interchangeable attachment for an article as recited by claim 1, wherein said central section of said article comprises a shallow border, wherein said connection means is located on said shallow border of said central section, and wherein said back wall of said interchangeable attachment comprises a shallow rim and said securing member is located on said shallow rim.

10. An interchangeable attachment for an article as recited by claim 1, wherein an interchangeable attachment kit is provided comprising a plurality of said interchangeable attachments each having varying show surfaces.

11. An interchangeable attachment for an article as recited by claim 1 comprising a plurality of holes integrated in said central portion of said article and a corresponding plurality of buttons integrated in said interchangeable attachment, and wherein at least one secondary interchangeable attachment or decorative attachment is provided that is appointed to be receive within said holes.

12. An interchangeable attachment for an article as recited by claim 1, wherein said article comprises water resistant properties appointed for substantially keeping said pet dry during inclement weather.

13. An interchangeable attachment for an article as recited by claim 1, wherein a plurality of interchangeable attachments is provided to create a layered configuration.

14. An interchangeable attachment for an article as recited by claim 1, wherein said central section of said article includes a shell show surface so that said article may be worn by said pet without said interchangeable attachment.

15. An interchangeable attachment for an article as recited by claim 1, wherein said article includes an insulated inner layer for substantially keeping said pet warm in cold weather.

16. An interchangeable attachment for an article as recited by claim 1, wherein said interchangeable attachment comprises water resistant properties appointed for substantially keeping said pet dry during inclement weather.

17. An interchangeable attachment for an article as recited by claim 1, wherein said central section of said article is constructed to form a top segment, an underside segment with a closure and a front segment with a collar closure and wherein said interchangeable attachment is correspondingly formed having a upper segment, an under segment and a front segment so that said interchangeable attachment substantially covers said article when said interchangeable attachment is attached thereon.

18. An interchangeable attachment for an article as recited by claim 1, wherein said interchangeable attachment comprises a designable surface so that a user can design or decorate at least a portion of said show surface of said interchangeable attachment.

19. An interchangeable attachment for an article, comprising:
   a. said article having a proximal end, distal end and a central section, wherein said article forms pet gear appointed to be worn by a pet;
   b. said central section of said article having at least one connection means appointed to receive at least one said interchangeable attachment;
   c. said interchangeable attachment comprising a top wall having a show surface, side walls, and a back wall having a securing member adapted to engage with said connection means of said central section of said article for removably attaching said interchangeable attachment to said article; and
   d. said connection means of said central section substantially covering said central section of said article and said securing member substantially covering said back wall of said interchangeable attachment.

20. An interchangeable attachment for an article, comprising:
   a. said article having a proximal end, distal end and a central section, wherein said article forms pet gear appointed to be worn by a pet;
   b. said central section of said article having at least one connection means appointed to receive at least one said interchangeable attachment;
   c. said interchangeable attachment comprising a top wall having a show surface, side walls, and a back wall having a securing member adapted to engage with said connection means of said central section of said article for removably attaching said interchangeable attachment to said article; and d. said central section of said article comprising a shallow border, wherein said connection means is located on said shallow border of said central section, and said back wall of said interchangeable attachment comprising a shallow rim and said securing member being located on said shallow rim.

21. An interchangeable attachment for an article, comprising:
   a. said article having a proximal end, distal end and a central section, wherein said article forms pet gear appointed to be worn by a pet;
   b. said central section of said article having at least one connection means appointed to receive at least one said interchangeable attachment;
   c. said interchangeable attachment comprising a top wall having a show surface, side walls, and a back wall having a securing member adapted to engage with said connection means of said central section of said article for removably attaching said interchangeable attachment to said article; and
   d. said article comprising water resistant properties appointed for substantially keeping said pet dry during inclement weather.

22. An interchangeable attachment for an article, comprising:
   a. said article having a proximal end, distal end and a central section, wherein said article forms pet gear appointed to be worn by a pet;
   b. said central section of said article having at least one connection means appointed to receive at least one said interchangeable attachment;
   c. said interchangeable attachment comprising a top wall having a show surface, side walls, and a back wall having a securing member adapted to engage with said connection means of said central section of said article for removably attaching said interchangeable attachment to said article; and
   d. said article including an insulated inner layer for substantially keeping said pet warm in cold weather.

23. An interchangeable attachment for an article, comprising:
   a. said article having a proximal end, distal end and a central section, wherein said article forms pet gear appointed to be worn by a pet;
   b. said central section of said article having at least one connection means appointed to receive at least one said interchangeable attachment;
   c. said interchangeable attachment comprising a top wall having a show surface, side walls, and a back wall having a securing member adapted to engage with said connection means of said central section of said article for removably attaching said interchangeable attachment to said article; and
   d. said interchangeable attachment comprising water resistant properties appointed for substantially keeping said pet dry during inclement weather.

24. An interchangeable attachment for an article, comprising:
   a. said article having a proximal end, distal end and a central section, wherein said article forms pet gear appointed to be worn by a pet;
   b. said central section of said article having at least one connection means appointed to receive at least one said interchangeable attachment;
   c. said interchangeable attachment comprising a top wall having a show surface, side walls, and a back wall having a securing member adapted to engage with said connection means of said central section of said article for removably attaching said interchangeable attachment to said article; and
   d. said central section of said article being constructed to form a top segment, an underside segment with a closure and a front segment with a collar closure and wherein said interchangeable attachment is correspondingly formed having an upper segment, an under segment and a front segment so that said interchangeable attachment substantially covers said article when said interchangeable attachment is attached thereon.

25. An interchangeable attachment for an article, comprising:
   a. said article having a proximal end, distal end and a central section, wherein said article forms pet gear appointed to be worn by a pet;
   b. said central section of said article having at least one connection means appointed to receive at least one said interchangeable attachment;
   c. said interchangeable attachment comprising a top wall having a show surface, side walls, and a back wall having a securing member adapted to engage with said connection means of said central section of said article for removably attaching said interchangeable attachment to said article; and
   d. said interchangeable attachment being treated with insect repellent to protect the pet from insect bites and stings.

* * * * *